(12) United States Patent
Galli

(10) Patent No.: US 11,548,662 B2
(45) Date of Patent: Jan. 10, 2023

(54) AIRCRAFT DEPLOYABLE SENSOR SYSTEM

(71) Applicant: The Boeing Company, Chicago, IL (US)

(72) Inventor: Alessandro E. Galli, Seattle, WA (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 16/903,817

(22) Filed: Jun. 17, 2020

(65) Prior Publication Data
US 2021/0394932 A1  Dec. 23, 2021

(51) Int. Cl.
*G06F 17/00* (2019.01)
*B64F 5/60* (2017.01)
*G01S 13/95* (2006.01)
*G01S 13/88* (2006.01)
*G01P 5/16* (2006.01)
*G01W 1/16* (2006.01)
*G01K 13/02* (2021.01)
*G01W 1/04* (2006.01)

(52) U.S. Cl.
CPC .............. *B64F 5/60* (2017.01); *G01K 13/02* (2013.01); *G01P 5/16* (2013.01); *G01S 13/882* (2013.01); *G01S 13/953* (2013.01); *G01W 1/04* (2013.01); *G01W 1/16* (2013.01)

(58) Field of Classification Search
CPC ... B64F 5/60; G01K 13/02; G01P 5/16; G01P 5/165; G01P 13/025; G01S 13/882; G01S 13/953; G01S 7/40; G01S 13/865; G01S 13/87; G01W 1/04; G01W 1/16; B64D 2045/0085; B64D 43/02; Y02A 90/10

USPC .......................................................... 701/29
See application file for complete search history.

(56) References Cited

U.S. PATENT DOCUMENTS

| 4,981,038 | A |   | 1/1991  | Torres et al. |            |
|-----------|-----|---|---------|---------------|------------|
| 6,900,642 | B2 | * | 5/2005  | Zank          | G01R 31/001 |
|           |    |   |         |               | 324/72     |
| 7,123,199 | B2 | * | 10/2006 | Rotta         | H01Q 1/28  |
|           |    |   |         |               | 342/61     |
| 7,837,149 | B2 | * | 11/2010 | Mackin        | B64C 9/20  |
|           |    |   |         |               | 244/214    |
| 8,523,102 | B2 | * | 9/2013  | Shue          | G05D 1/0077 |
|           |    |   |         |               | 701/11     |
| 10,106,263 | B2 | * | 10/2018 | Horner       | B64D 45/00 |
| 10,202,204 | B1 | * | 2/2019  | Daidzic      | B64C 5/02  |
| 10,386,305 | B2 | * | 8/2019  | Okoli        | G01N 21/70 |

(Continued)

FOREIGN PATENT DOCUMENTS

WO          9414075 A1     6/1994

OTHER PUBLICATIONS

"Air Data System Workbook: ADS 21002," United Space Alliance, LLC, Jul. 7, 2006, 80 pages.

*Primary Examiner* — Ronnie M Mancho
(74) *Attorney, Agent, or Firm* — Yee & Associates, P.C.

(57) ABSTRACT

A method, apparatus, and system for managing sensor system for an aircraft. A presence of erroneous sensor data generated by a set of external sensors on an exterior of the aircraft is detected. A set of deployable sensors is deployed in response to the erroneous sensor data being received from the set of external sensors on the exterior of the aircraft when an undesired environmental condition adverse to the set of external sensors on the exterior of the aircraft is absent. Sensor data is received from the set of deployable sensors.

30 Claims, 7 Drawing Sheets

(56) References Cited

U.S. PATENT DOCUMENTS

| | | | |
|---|---|---|---|
| 10,762,251 B2* | 9/2020 | Santarone | G06V 20/20 |
| 11,351,680 B1* | 6/2022 | Rosenberg | B25J 19/0095 |
| 2010/0012785 A1* | 1/2010 | Mackin | B64D 15/20 |
| | | | 244/134 F |
| 2011/0180656 A1* | 7/2011 | Shue | G05B 19/0428 |
| | | | 701/31.4 |
| 2013/0257641 A1* | 10/2013 | Ronning | G01S 13/42 |
| | | | 342/54 |
| 2014/0316613 A1* | 10/2014 | Jang | G05B 23/0286 |
| | | | 701/3 |
| 2019/0204449 A1* | 7/2019 | Yuk | G08G 5/065 |
| 2021/0332760 A1* | 10/2021 | Gangloff, Jr. | B32B 3/12 |

\* cited by examiner

AIRCRAFT DEPLOYABLE SENSOR SYSTEM

BACKGROUND INFORMATION

1. Field

The present disclosure relates generally to sensor systems and, in particular, to a deployable sensor system for an aircraft.

2. Background

Sensors on an exterior of an aircraft include air data sensors. Air data sensors make measurements using airflow on the exterior of the aircraft. For example, an air data sensor can be used to measure parameters such as angle of attack, angle of slide slip, airspeed, altitude, and other parameters.

Sensors located on the exterior of the aircraft are exposed to the environment around the outside of the aircraft. The environment can include heat, cold, rain, or other conditions. Further, undesired environmental conditions, such as hail, birds, or volcanic ash, can also be present and cause the air data sensors to cease generating sensor data or generate inaccurate sensor data. Redundant air data sensors can be present, but some undesired environmental conditions can also affect the redundant air data sensors.

Therefore, it would be desirable to have a method and apparatus that take into account at least some of the issues discussed above, as well as other possible issues. For example, it would be desirable to have a method and apparatus that overcome a technical problem with generating sensor data from sensors on an exterior of an aircraft.

SUMMARY

An embodiment of the present disclosure provides a method for managing a sensor system for an aircraft. A presence of erroneous sensor data generated by a set of external sensors on an exterior of the aircraft is detected. A set of deployable sensors is deployed in response to the erroneous sensor data being received from the set of external sensors on the exterior of the aircraft when an undesired environmental condition adverse to the set of external sensors on the exterior of the aircraft is absent. Sensor data is received from the set of deployable sensors.

Another embodiment of the present invention provides a sensor system comprising a computer system and a sensor manager in the computer system. The sensor manager is configured to detect a presence of erroneous sensor data generated by a set of external sensors on an exterior of an aircraft. The sensor manager is configured to deploy a set of deployable sensors in response to detecting the erroneous sensor data when an undesired environmental condition adverse to the set of external sensors on the exterior of the aircraft is absent. The sensor manager is configured to receive sensor data from the set of deployable sensors.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that undesired environmental conditions can cause sensors on an exterior of an aircraft to become unusable or reduce an ability to provide sensor data with a desired level of accuracy. The illustrative embodiments also recognize and take into account that operating the aircraft with reduced sensor data can increase a workload on a crew of the aircraft.

Thus, the illustrative embodiments provide a method, apparatus, and system for managing a sensor system for an aircraft. In one illustrative example, a presence of erroneous sensor data generated by a set of external sensors on an exterior of an aircraft is detected. A set of deployable sensors is deployed in response to the erroneous sensor data being received from the set of external sensors on the exterior of the aircraft when an undesired environmental condition adverse to the set of external sensors on the exterior of the aircraft is absent. Sensor data is received from the set of deployable sensors.

As used herein, a "set of," when used with reference to items, means one or more items. For example, a "set of deployable sensors" is one or more deployable sensors.

Figure 1:
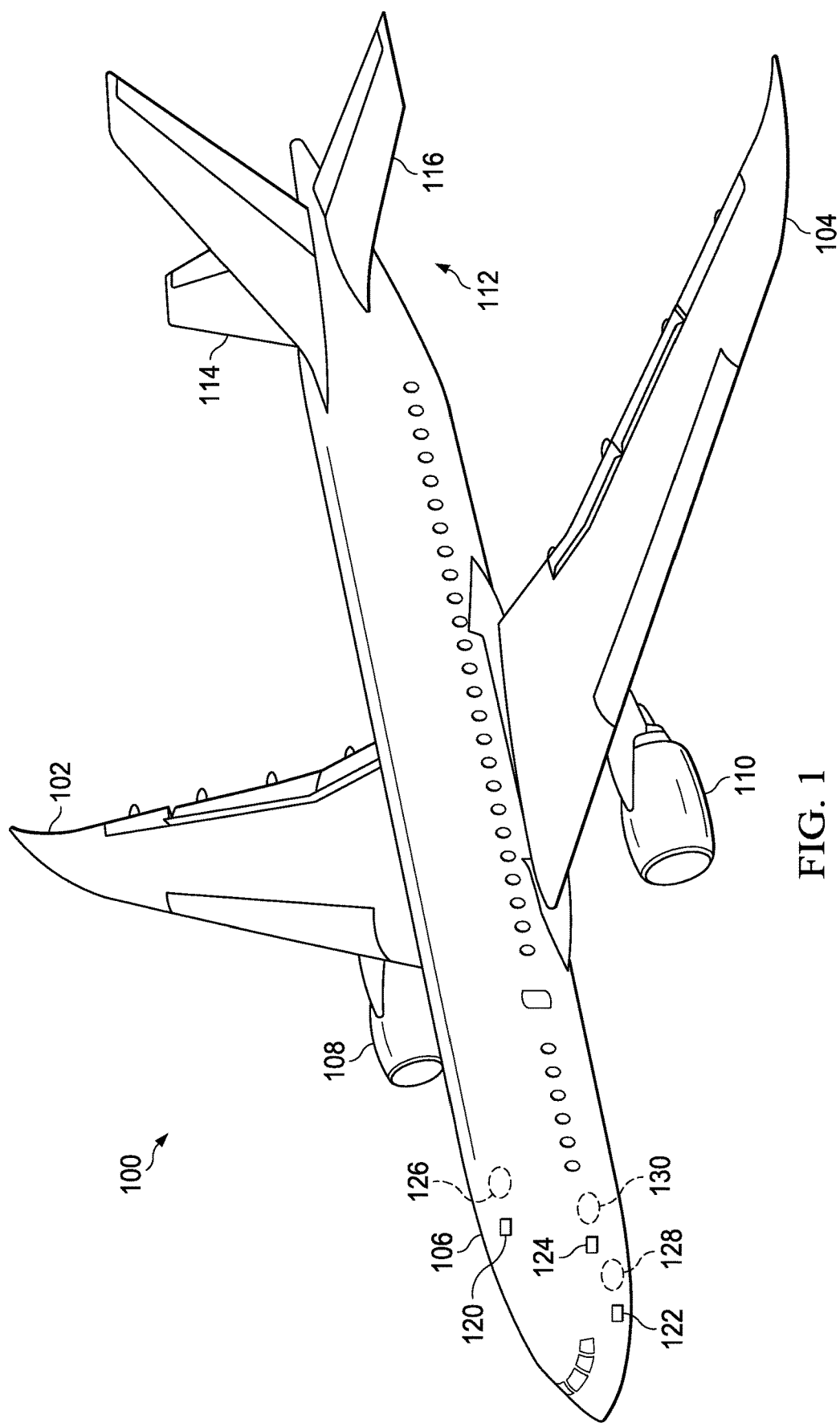
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 also has external sensors. In this illustrative example, three external sensors are illustrated although other aircraft have more sensors or less sensors. As depicted in this illustration, the external sensors include very high frequency (VHF) antenna 120, pitot tube 122, and angle of attack (AOA) vane 124. These depicted external sensors can be damaged during operation of aircraft 100. For example, an undesired environmental condition, such as a bird strike, can cause inconsistencies in at least one of very high frequency (VHF) antenna 120, pitot tube 122, or angle of attack (AOA) vane 124. These inconsistencies can be physical changes to the sensors such that erroneous sensor data is generated. The erroneous sensor data can be an absence of sensor data in addition to incorrect measurements.

Aircraft 100 is an example of an aircraft in which sensors in the sensor system can be managed in a manner that reduces effects from undesired environmental conditions in accordance with an illustrative embodiment. As depicted, deployable sensors are located in aircraft 100 in location 126, location 128, and location 130. For example, a deployable very high frequency (VHF) antenna can be within aircraft 100 in location 126. A deployable pitot tube can be within aircraft 100 in location 128, and a deployable angle of attack (AOA) vane can be in aircraft 100 in location 130.

The deployable sensors at location 126, location 128, and location 130 can be deployed from these locations within aircraft 100 to the external locations to replace sensors with inconsistencies in accordance with an illustrative example. Deployable vanes are not subject to environmental factors when undeployed because they are located in aircraft 100 in a manner that shields or protects the deployable vanes from the environment.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
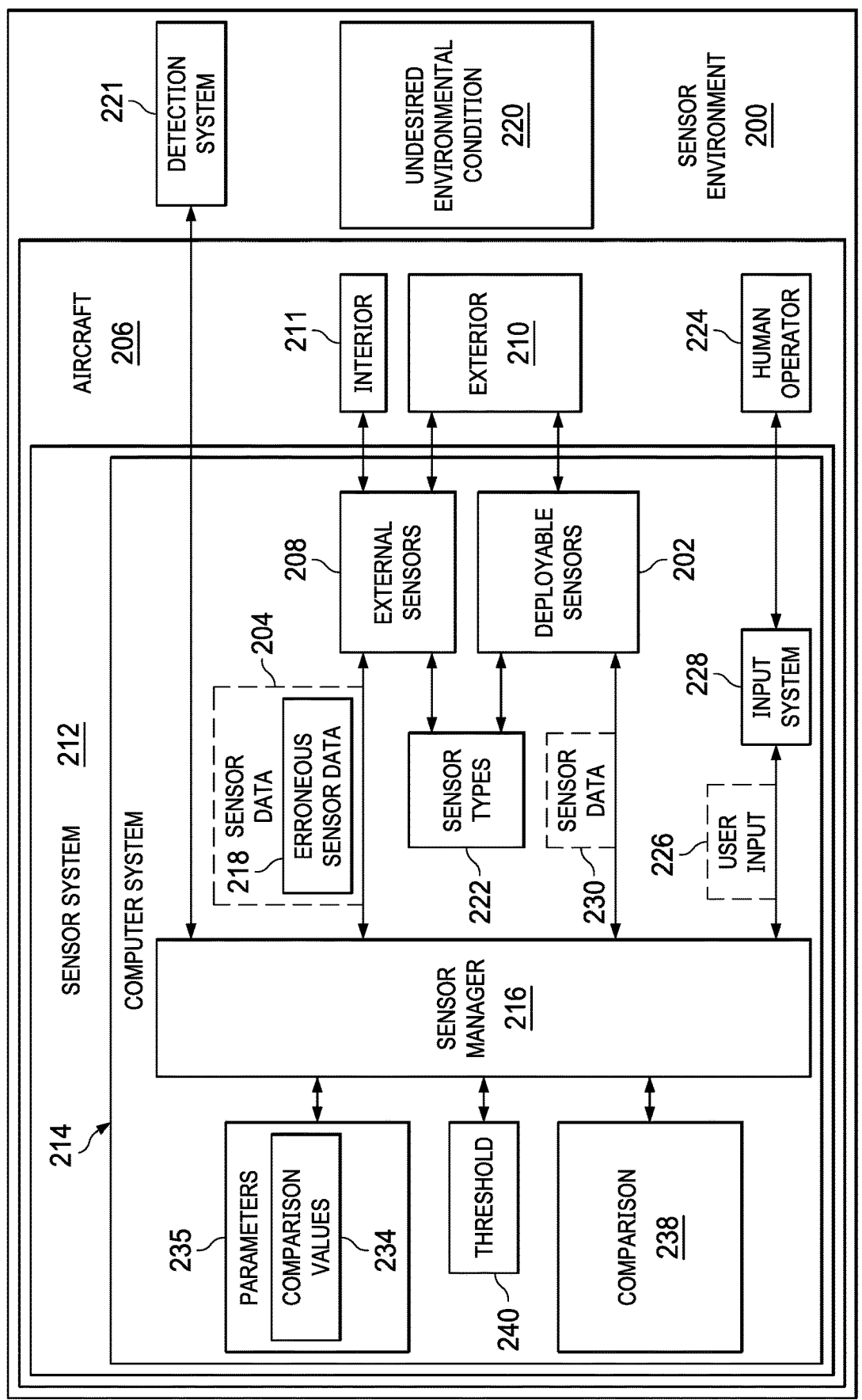
FIG. 2 is an illustration of a block diagram of a sensor environment in accordance with an illustrative embodiment.

With reference next to FIG. 2, an illustration of a block diagram of a sensor environment is depicted in accordance with an illustrative embodiment. In this illustrative example, sensor environment 200 is an example of an environment in which deployable sensors 202 can be used to receive sensor data 204 for aircraft 206 when external sensors 208 on exterior 210 of aircraft 206 are not operating as desired.

In this illustrative example, deployable sensors 202 and external sensors 208 can take a number of different forms. For example, deployable sensors 202 and external sensors 208 can be selected from at least one of an air data sensor, a pitot tube, an angle of attack vane AOA), a true air temperature probe, a slide slip vane, a static port, an antenna, a satellite antenna, a radio antenna, an icing sensor, an optical sensor, a radio altimeter, or some other suitable type of sensor.

In this illustrative example, external sensors 208 are sensors that are on exterior 210 of aircraft 206. The sensors may be fixed or retractable in different illustrative examples. Deployable sensors 202 can be stored or located in interior 211 of aircraft 206 when not being used in the illustrative example. Deployable sensors 202 can be moved to exterior 210 of aircraft 206 when deployed for use in generating sensor data 230. Currently available mechanisms for moving or deploying sensors from an interior of an aircraft to an exterior of the aircraft can be used to deploy deployable sensors 202.

Aircraft 206 can take a number of different forms. Aircraft 100 depicted in FIG. 1 is an example of one manner in which aircraft 206 can be implemented. Aircraft 206 can be, for example, a commercial aircraft, an airplane, a rotorcraft, a tilt-rotor aircraft, a tilt-wing aircraft, a vertical takeoff and landing (VTOL) aircraft, and other suitable types of aircraft.

As used herein, a "number of," when used in reference to items, means one or more items. For example, a "number of different forms" is one or more different forms.

In this illustrative example, deployable sensors 202 and external sensors 208 are components within sensor system 212. Sensor system 212 also comprises computer system 214 and sensor manager 216. Sensor manager 216 is located in computer system 214.

Sensor manager 216 can be implemented in software, hardware, firmware, or a combination thereof. When software is used, the operations performed by sensor manager 216 can be implemented in program code configured to run on hardware, such as a processor unit. When firmware is used, the operations performed by sensor manager 216 can be implemented in program code and data and stored in persistent memory to run on a processor unit. When hardware is employed, the hardware can include circuits that operate to perform the operations in sensor manager 216.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 214 is a physical hardware system and includes one or more data processing systems. When more than one data processing system is present in computer system 214, those data processing systems are in communication with each other using a communications medium. The communications medium can be a network. The data processing systems can be selected from at least one of a computer, a server computer, a tablet computer, or some other suitable data processing system.

In the illustrative example, sensor manager 216 is configured to perform a number of different operations in managing sensor system 212. For example, sensor manager 216 can detect a presence of erroneous sensor data 218 generated by a set of external sensors 208 on exterior 210 of aircraft 206. In the illustrative example, erroneous sensor data 218 can be sensor data 204 with incorrect values or can be an absence of sensor data 204 from one or more of external sensors 208.

In this illustrative example, erroneous sensor data 218 can be present in the sensor data 204 received from the set of external sensors 208 in a number of different ways. For example, wherein erroneous sensor data 218 is present when one or more sensors in the set of external sensors 208 generate erroneous sensor data 218, voting between sensor data 204 from the set of external sensors 208 can indicate that sensor data 204 is untrustworthy. In another example, when one or more sensors in the set of external sensors 208 generate erroneous sensor data 218, voting between sensor data 204 from the set of external sensors 208 can indicate that the sensor data 204 is trustworthy even though one or more of the set of external sensors 208 generates sensor data 204 with values that are incorrect.

In the illustrative example, sensor manager 216 can detect the presence of erroneous sensor data 218 generated by the set of external sensors 208 on exterior 210 of aircraft 206 by comparing sensor data 204, generated by the set of external sensors 208 on exterior 210 of aircraft 206, to comparison values 234 for parameters 235 in sensor data 204 from the set of external sensors 208 to form comparison 238. As depicted, comparison values 234 can be obtained from at least one of a data structure, an equation, a simulation, a sensor, or some other source. Sensor manager 216 can determine that sensor data 204 from the set of external sensors 208 is erroneous sensor data 218 when a difference in comparison 238 is greater than threshold 240.

As depicted, threshold 240 can be selected as a value or values that indicate when sensor data 204 is considered erroneous. Threshold 240 can also be selected to indicate when sensor data 204 can be considered to be reliable for use in operating aircraft 206.

As depicted, sensor manager 216 can determine whether undesired environmental condition 220 adverse to the set of external sensors 208 on exterior 210 of aircraft 206 is absent when erroneous sensor data 218 is present. In the illustrative example, undesired environmental condition 220 does not need to be the cause of the set of external sensors 208 generating erroneous sensor data 218. For example, one or more of the set of external sensors 208 can fail or otherwise operate in an undesired manner for other causes. For example, reaching end-of-life, experiencing a current fluctuation, or some other condition other than undesired environmental condition 220 may cause the generation of erroneous sensor data 218 by one or more of the set of external sensors 208.

In this illustrative example, sensor manager 216 can determine whether undesired environmental condition 220 is present in a number of different ways. For example, sensor manager 216 can use detection system 221 in determining whether undesired environmental condition 220 is present for aircraft 206. As depicted, detection system 221 provides information that can be used by sensor manager 216 to determine whether undesired environmental condition 220 is present. This information can include, for example, at least one of a weather forecast, current weather conditions, an occurrence of lightning, volcanic ash, a sandstorm, an occurrence of hail, a presence of insects, the presence of birds, or other suitable types of information that can be used to identify undesired environmental conditions.

Detection system 221 can take a number of different forms. For example, detection system 221 can be a hardware system that is selected from at least one of an onboard radar system located in the aircraft, a remote radar system, a camera system, an avian radar system, a weather radar system, a light detection and ranging (LiDAR) system, or some other suitable type of system. In another illustrative example, detection system 221 can include human operator 224 that makes observations about the environment. Human operator 224 can be located in aircraft 206 or can be in another aircraft or location.

In this illustrative example, undesired environmental condition 220 can take a number of different forms. For example, undesired environmental condition 220 can be selected from one of lighting, birds, volcanic ash, hail, insects, sand from a sandstorm, icing on the aircraft, and other undesired environmental conditions that can cause the set of external sensors 208 to generate erroneous sensor data 218.

Sensor manager 216 can deploy a set of deployable sensors 202 in response to detecting erroneous sensor data 218 when undesired environmental condition 220 adverse to the set of external sensors 208 on exterior 210 of aircraft 206 is absent. In deploying the set of deployable sensors 202, sensor manager 216 deploys all or some of deployable sensors 202.

For example, sensor manager 216 can determine a set of sensor types 222 for the set of external sensors 208 generating erroneous sensor data 218. A sensor type can be, for example, a pitot tube, an angle of attack (AOA) sensor, a temperature sensor, or some other type of sensor. Sensor manager 216 can select the set of deployable sensors 202 as replacements for the set of external sensors 208 based on the set of sensor types 222 determined for the set of external sensors 208.

Deployable sensors 202 selected as replacements for external sensors 208 can be a one-for-one replacement. In other illustrative examples, two or more of deployable sensors 202 of the same sensor type as a failed external sensor in external sensors 208 can be selected as replacements.

In another illustrative example, the deployment of the set of deployable sensors 202 is performed automatically by sensor manager 216. In some illustrative examples, sensor manager 216 can present the option to deploy the set of deployable sensors 202 to human operator 224 of aircraft 206.

In other illustrative examples, human operator 224 can deploy the set of deployable sensors 202 with or without prompting by sensor manager 216. With this example, the deployment can be performed by human operator 224 generating user input 226 commanding a deployment of the set of deployable sensors 202 that is currently undeployed on exterior 210 of aircraft 206.

As depicted, user input 226 can be generated by human operator 224 operating input system 228. In this illustrative example, input system 228 is a physical hardware system and can be selected from at least one of a switch, a guarded switch, a toggle switch, a float switch, a mouse, a keyboard, a trackball, a touchscreen, a stylus, a motion sensing input device, a gesture detection device, a cyber glove, or some other suitable type of input device.

In this illustrative example, sensor manager 216 receives sensor data 230 from the set of deployable sensors 202 deployed on exterior 210 of aircraft 206. Sensor manager 216 can determine whether sensor data 230 from the set of deployable sensors 202 on exterior 210 of aircraft 206 can be relied on for operating aircraft 206.

In this illustrative example, the determination of whether sensor data 230 from the set of deployable sensors 202 on exterior 210 of aircraft 206 is reliable can be determined in a number of different ways. For example, the validity of sensor data 230 can be performed by checking the continuity of a circuit for the sensor.

In determining whether sensor data 230 from the set of deployable sensors 202 deployed on exterior 210 of aircraft 206 can be relied on for operating aircraft 206, sensor manager 216 can compare sensor data 230 generated by the set of deployable sensors 202 deployed on exterior 210 of aircraft 206 to comparison values 234 for sensor data 230 in which comparison values 234 can be obtained from at least one of a data structure, an equation, a simulation or other source to form comparison 238. Sensor manager 216 can determine whether sensor data 230 can be relied on when a difference in comparison 238 is less than threshold 240. In this example, the values for threshold 240 can be different when determining whether sensor data 230 is reliable for use in operating aircraft 206 as compared to when determining whether sensor data 204 is erroneous sensor data 218.

If signals from deployable sensors 202 are valid, sensor data 230 in the signals can be compared directly to sensor data 204 or sensor data 230 in the signals from other sensors of the same type. These other sensors can be external sensors 208 or other deployable sensors in deployable sensors 202 that have been deployed.

For example, this comparison can be made from sensor data received from a physical sensor or from a simulation of a sensor. This comparison can be formed using voting algorithms or processes. This type of comparison can be useful when the sensor data from the sensors are known or presumed to be correct. This type of process can return the system to previous levels of redundancy of data received from sensors of the same type.

As another example, with angle of attack (AOA) vanes, a determination can be made as to whether the sensor data from the deployable angle of attack vanes that have been deployed is valid by comparison to others. For example, this check can be made with sensor data from the rest of the angle of attack (AOA) vanes. As another example, the sensor data can be checked against sensor data from a simulation of an angle of attack.

As another example, existing sensor data can be used in combination to generate a derived sensor data that is directly comparable to the deployed sensor. For example, if a deployable sensor that has been deployed is a pitot tube, the airspeed in the sensor data from the pitot tube can be compared to an angle of attack derived airspeed.

The inverse is also true. Sensor data of the deployed sensor can be used in combination with existing sensor data to generate a derived sensor data that is directly comparable to an existing sensor data. In yet another example, if an angle of attack vane is deployed, the angle of attack airspeed can be derived from angle of attack measurements in the sensor data and compared to the airspeed measured by a pitot tube to determine if the angle of attack measurements in the sensor data are accurate.

If both an angle of attack vane and a pitot tube are deployed, an angle of attack airspeed can be derived from the measurements of the angle of attack in the sensor data from the angle of attack. The angle of attack airspeed can then be compared to the airspeed measured by the pitot tube.

In another illustrative example, if the deployable sensor is a radio altimeter, the radio altitude measurements can be compared to a global positioning system derived altitude minus the terrain altitude at the location of the aircraft. In the illustrative examples, these derived values are examples of comparison values 234.

Sensor manager 216 can determine whether sensor data 230 can be relied on when a difference in comparison 238 is less than threshold 240. In this example, the values for threshold 240 can be different when determining whether sensor data 230 is reliable for use in operating aircraft 206 as compared to threshold 240 for determining whether sensor data 204 is erroneous sensor data 218.

In this example, comparison values 234 can be expected values for sensor data 230 for a particular state of aircraft 206. In other words, sensor manager 216 can determine a current state of aircraft 206 and compare values for parameters from the current state to comparison values 234 for the parameters in the corresponding state. In this illustrative example, comparison values 234 can be determined for particular states. The states of aircraft 206 can be phases of flight such as, for example, take-off, ascent, cruising, descent, landing, or other states. The states can be based on parameters such as aircraft speed, attitude, altitude, weight, fuel usage, and other suitable parameters.

In the illustrative example, sensor manager 216 can replace erroneous sensor data 218 generated by the set of external sensors 208 with sensor data 230 from the set of deployable sensors 202 deployed on exterior 210 of aircraft 206. The replacement can be performed when sensor data 230 from the set of deployable sensors 202 deployed on exterior 210 of aircraft 206 can be relied on for operating aircraft 206. Sensor manager 216 can determine whether sensor data 230 from the set of deployable sensors 202 deployed on exterior 210 of aircraft 206 from the set of deployable sensors 202 deployed on exterior 210 of aircraft 206 can be relied on for use in operating aircraft 206. This determination can also be performed with user input 226 in addition to or in place of the determination made by sensor manager 216.

In the illustrative example, the replacement of erroneous sensor data 218 with sensor data 230 from the set of deployable sensors 202 can be performed in a number of different ways. For example, sensor data 230 can be displayed in place of sensor data 204 when sensor data 204 is erroneous sensor data 218. Further, sensor data 230 can be used for calculations and other processing by other aircraft systems in computer system 214 for aircraft 206. These other aircraft systems can include at least one of a navigation system, an environmental system, an electrical system, a fuel system, an aircraft flight control system, a collision avoidance system, a communications system, or other aircraft systems that may be present in computer system 214 in aircraft 206.

In another illustrative example, sensor manager 216 can add sensor data 230 to sensor data 204 containing erroneous sensor data 218 when sensor data 230 can be relied on for operating aircraft 206. When voting is present, the addition of sensor data 230 to sensor data 204 can provide additional data for voting.

In one illustrative example, one or more technical solutions are present that overcome a technical problem with generating sensor data from sensors on an exterior of an aircraft when sensors on the exterior of the aircraft do not function as desired to provide sensor data to operate the aircraft. As a result, one or more technical solutions can provide a technical effect of providing redundancy for external sensors failing to operate as desired. In one or more illustrative examples, a technical effect is present in which deployable sensors are deployed from an interior location of the aircraft to an exterior location when an undesired environmental condition that is adverse to the operation of an external sensor is absent. As a result, the deployable sensors are not deployed when the deployable sensors can be affected by the environment in an adverse manner.

Computer system 214 can be configured to perform at least one of the steps, operations, or actions described in the different illustrative examples using software, hardware, firmware, or a combination thereof. As a result, computer system 214 operates as a special purpose computer system in which sensor manager 216 in computer system 214 enables managing the operation of sensors in sensor system 212. In particular, sensor manager 216 transforms computer system 214 into a special purpose computer system as compared to currently available general computer systems that do not have sensor manager 216.

The illustration of sensor system 212 in the different components in the sensor system in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

As depicted, erroneous sensor data 218 can be detected by human operator 224 in addition to or in place of sensor manager 216 detecting erroneous sensor data 218. Further, external sensors 208 and deployable sensors 202 can be organized using different architectures. For example, at least one of a federated or integrated architecture can be used for these sensors.

For example, a federated sensor system is a hardware system in which multiple groups of sensors are present. In the federated sensor system, the sensors are managed in groups. These groups of sensors output sensor data individually to aircraft systems in computer system 214. With this type of architecture, adjustment of the sensor data can be performed within a group of sensors. Comparison of the sensor data between different groups of sensors can be performed and differences can be identified.

In this illustrative example, an integrated sensor system is a hardware system in which all of the sensors send data to a central location or component in computer system 214. In an integrated sensor system, the sensors are centrally managed. Computer system 214 can determine which values in the sensor data are considered to be correct and output for use in aircraft 206.

Figure 3:
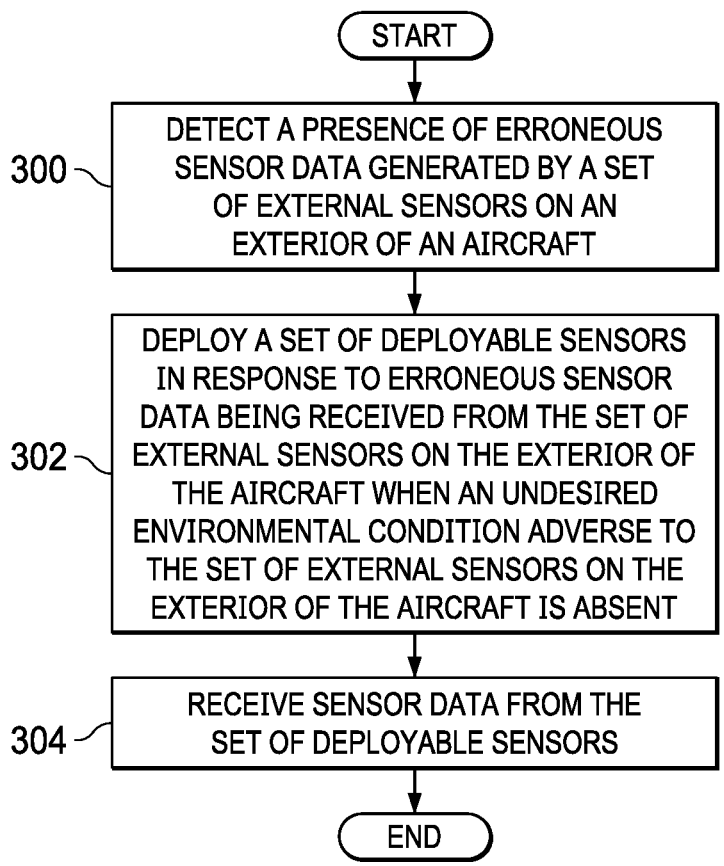
FIG. 3 is an illustration of a flowchart of a process for managing a sensor system in accordance with an illustrative embodiment.

Turning next to FIG. 3, an illustration of a flowchart of a process for managing a sensor system is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in sensor manager 216 in computer system 214 in FIG. 2.

The process begins by detecting a presence of erroneous sensor data generated by a set of external sensors on an exterior of an aircraft (operation 300). In operation 300, the erroneous sensor data can be detected in a number of different ways. For example, the erroneous sensor data can be detected by at least one of a computer system, a human operator, or some other suitable system.

In one illustrative example, the sensor data can be considered erroneous sensor data that is unreliable when a discrepancy between values for parameters, such as an angle of attack, is great enough such that the angle of attack values in the sensor data generated by angle of attack sensors cannot be trusted.

The process deploys a set of deployable sensors in response to the erroneous sensor data being received from the set of external sensors on the exterior of the aircraft when an undesired environmental condition adverse to the set of external sensors on the exterior of the aircraft is absent (operation 302). The set of the deployable sensors can be some or all of the deployable sensors in the aircraft that are available for deployment but have not yet been deployed.

The process receives sensor data from the set of deployable sensors (operation 304). The process terminates thereafter.

Figure 4:
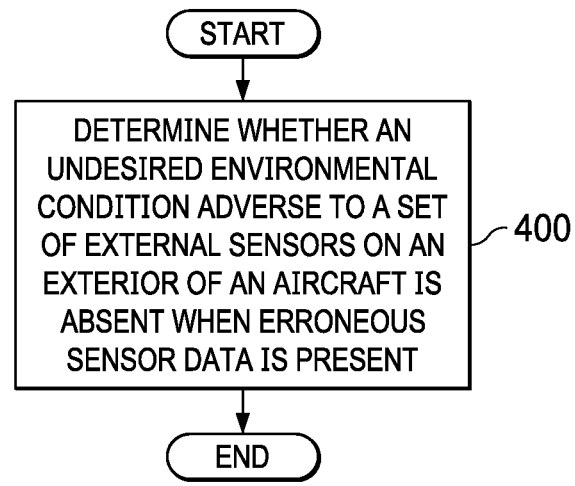
FIG. 4 is an illustration of a flowchart of a process for determining when an undesired environmental condition is present in accordance with an illustrative embodiment.

With reference to FIG. 4, an illustration of a flowchart of a process for determining when an undesired environmental condition is present is depicted in accordance with an illustrative embodiment. The process illustrated in FIG. 4 is an example of an additional operation that can be performed as part of the process depicted in FIG. 3.

The process determines whether an undesired environmental condition adverse to a set of external sensors on an exterior of an aircraft is absent when erroneous sensor data is present (operation 400). The process terminates thereafter.

Operation 400 can be performed to provide information for use in determining the set of deployable sensors in operation 302 in FIG. 3.

Figure 5:
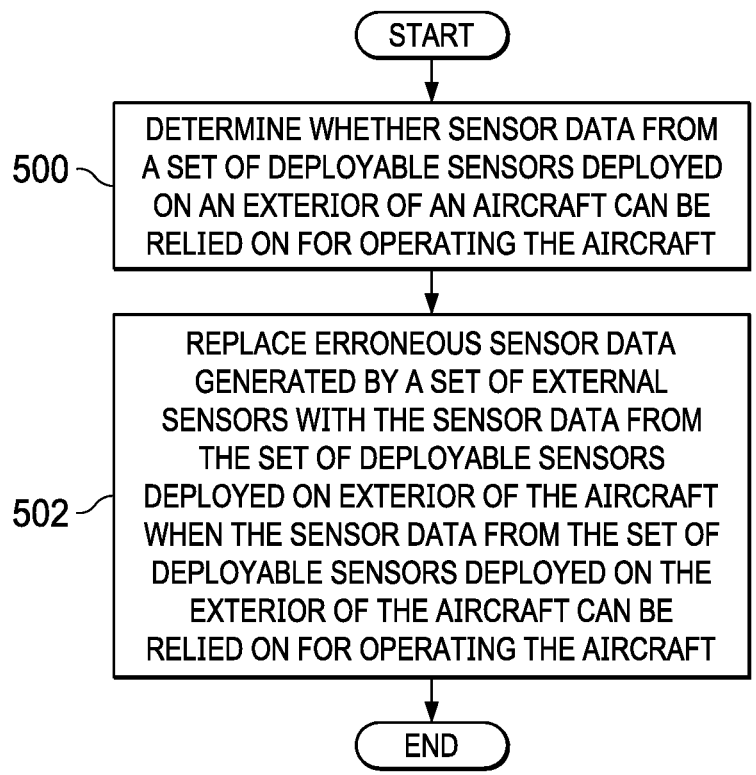
FIG. 5 is an illustration of a flowchart of a process for determining whether to use sensor data received from a set of deployable sensors that has been deployed on an exterior of an aircraft in accordance with an illustrative embodiment.

Turning next to FIG. 5, an illustration of a flowchart of a process for determining whether to use sensor data received from a set of deployable sensors that has been deployed on an exterior of an aircraft is depicted in accordance with an illustrative embodiment. The process illustrated in FIG. 5 is an example of additional operations that can be performed in the process depicted in FIG. 3.

The process begins by determining whether sensor data from a set of deployable sensors deployed on an exterior of an aircraft can be relied on for operating the aircraft (operation 500). For example, if a deployable sensor is deployed, the sensor data from this deployable sensor and other exterior sensors of the same type on the exterior of the aircraft can be used to determine whether the sensor data is considered to be reliable. Other sensors of other types on the exterior of the aircraft can also be used to determine whether the sensor data is considered to be reliable. For example, angle of attack measurements in sensor data from an angle of attack sensor can be used with other sensor data to derive airspeed for comparison to the airspeed measured by a deployable pitot tube sensor.

The process replaces erroneous sensor data generated by a set of external sensors with the sensor data from the set of deployable sensors deployed on the exterior of the aircraft when the sensor data from the set of deployable sensors deployed on the exterior of the aircraft can be relied on for operating the aircraft (operation 502). The process terminates thereafter.

Figure 6:
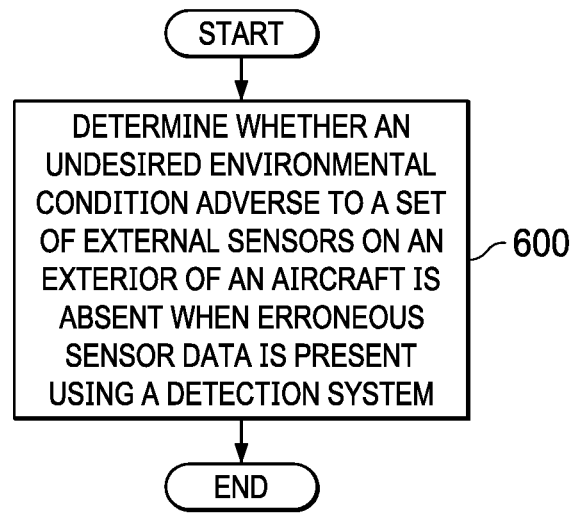
FIG. 6 is an illustration of a flowchart of a process for determining when an undesired adverse condition is present in accordance with an illustrative embodiment.

With reference next to FIG. 6, an illustration of a flowchart of a process for determining when an undesired environmental condition is present is depicted in accordance with an illustrative embodiment. The process illustrated in this flowchart is an example of one implementation for operation 400 in FIG. 4.

The process determines whether an undesired environmental condition adverse to a set of external sensors on an exterior of an aircraft is absent when erroneous sensor data is present using a detection system (operation 600). The process terminates thereafter.

The detection system in operation 600 is a physical system and can include software. The detection system can be comprised of one or more of an onboard radar system located in the aircraft, a remote radar system in another aircraft or at a ground location, a camera system, an avian radar system, a weather radar system, a light detection and ranging system (LiDAR), a human operator, or some other suitable type of system.

Figure 7:
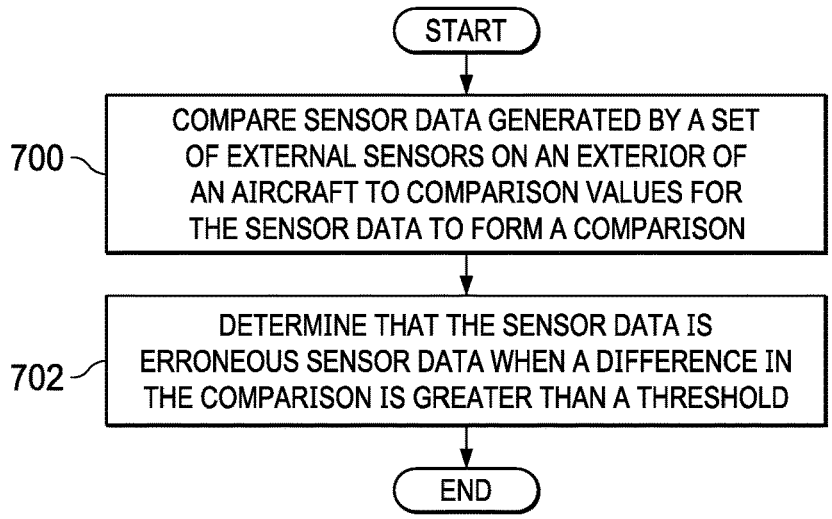
FIG. 7 is an illustration of a flowchart of a process for determining if a presence of erroneous sensor data is present in accordance with an illustrative embodiment.

In FIG. 7, an illustration of a flowchart of a process for determining a presence of erroneous sensor data is present is depicted in accordance with an illustrative embodiment. The process illustrated in this flowchart is an example of one manner in which operation 300 in FIG. 3 can be implemented.

The process begins by comparing sensor data generated by a set of external sensors on an exterior of an aircraft to comparison values for the sensor data to form a comparison (operation 700).

The process determines that the sensor data is the erroneous sensor data when a difference in the comparison is greater than a threshold (operation 702). The process terminates thereafter.

Figure 8:
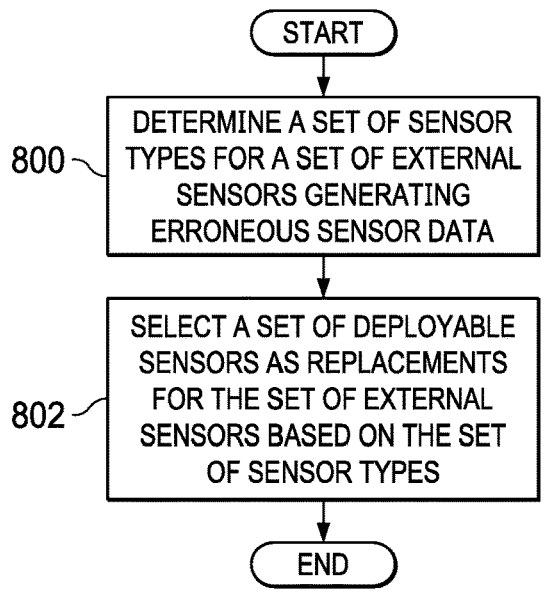
FIG. 8 is an illustration of a flowchart of a process for deploying a set of deployable sensors in accordance with an illustrative embodiment.

With reference now to FIG. 8, an illustration of a flowchart of a process for deploying a set of deployable sensors is depicted in accordance with an illustrative embodiment. The process illustrated in FIG. 8 is an example of one manner in which operation 302 in FIG. 3 can be implemented.

The process begins by determining a set of sensor types for a set of external sensors generating erroneous sensor data (operation 800). The process selects a set of deployable sensors as replacements for the set of external sensors based on the set of sensor types (operation 802). The process terminates thereafter.

In another example, all of the set of deployable sensors that have not been deployed can be deployed in response to the erroneous sensor data when the undesired environmental condition adverse to the set of external sensors on the exterior of the aircraft is absent to implement operation 302 in FIG. 3.

Figure 9:
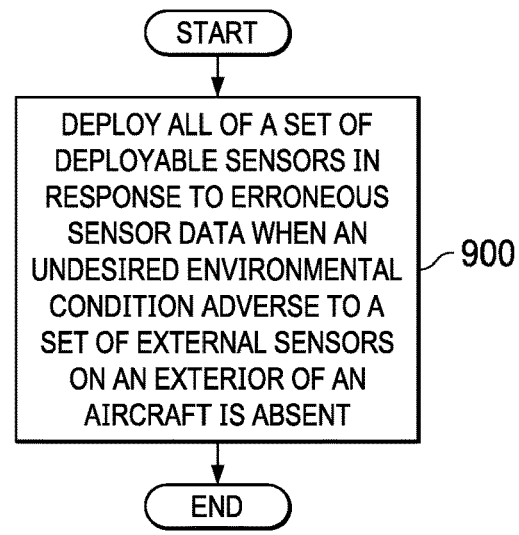
FIG. 9 is another illustration of a flowchart of a process for deploying a set of deployable sensors in accordance with an illustrative embodiment.

With reference now to FIG. 9, an illustration of a flowchart of another process for deploying a set of deployable sensors is depicted in accordance with an illustrative embodiment. The process illustrated in FIG. 9 is another example of a manner in which operation 302 in FIG. 3 can be implemented.

The process deploys all of a set of deployable sensors in response to erroneous sensor data when an undesired environmental condition adverse to a set of external sensors on an exterior of an aircraft is absent (operation 900). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

In the illustrative examples, a sensor manager can manage a deployment of deployable sensors in a number of different ways when an undesired environmental condition is absent from around an aircraft. In one illustrative example, two air data probes are external sensors. A third air data probe is a deployable sensor in an undeployed state and protected from the environment. This third air data probe can be deployed on command when an undesired environmental condition is absent. When sensor data measured by the two air data probes for parameters disagree with each other, the third air data probe can be deployed. The sensor data from the third air data probe can be analyzed to determine whether the sensor data is reliable. If the sensor data from the third air data probe is reliable, the sensor data can be used to overwrite the sensor data from one or both of the air sensor data probes.

In another illustrative example, erroneous sensor data can occur when reliable values for a parameter, such as airspeed, cannot be determined from sensor data measured by two air data probes. In this situation, a third air data probe can be deployed and the sensor data from the third air data probe can be used as another source of sensor data in addition to the two air data probes for voting to determine reliability of the sensor data.

In the illustrative examples, the deployment of the deployable sensors can be performed automatically by the sensor manager or through prompts to a human operator in the aircraft. With the deployment of the deployable sensors, the sensor data from that deployable sensor can be checked to determine whether the sensor data is reliable for use in operating the aircraft.

These examples are meant to be illustrative and not limit the manner in which other illustrative examples can be implemented. For example, detection of erroneous sensor data, deployment of deployable sensors, determining whether sensor data from the deployed deployable sensors is reliable, and other operations can be performed by a sensor manager in a computer system, a human operator, or some combination thereof.

In one example, a deployable air data probe can be deployed automatically by a sensor manager or in response to a user input from a crewmember in an aircraft. This user input can be generated by operating a switch such as a guarded switch. A guarded switch has a mechanism to avoid accidental activation of the switch. For example, the guarded switch may have a cover that has to be removed or opened.

In determining whether to use the sensor data from the deployable air data probe that has been deployed, after reviewing the data, the crewmember can operate another switch, such as a guarded switch, to cause the sensor data from the deployable air data probe to be used in operating the aircraft. The sensor data can be displayed on a display system for use by the crew, sent to aircraft systems for use in performing operations for the aircraft, or other suitable uses for operating the aircraft.

Figure 10:
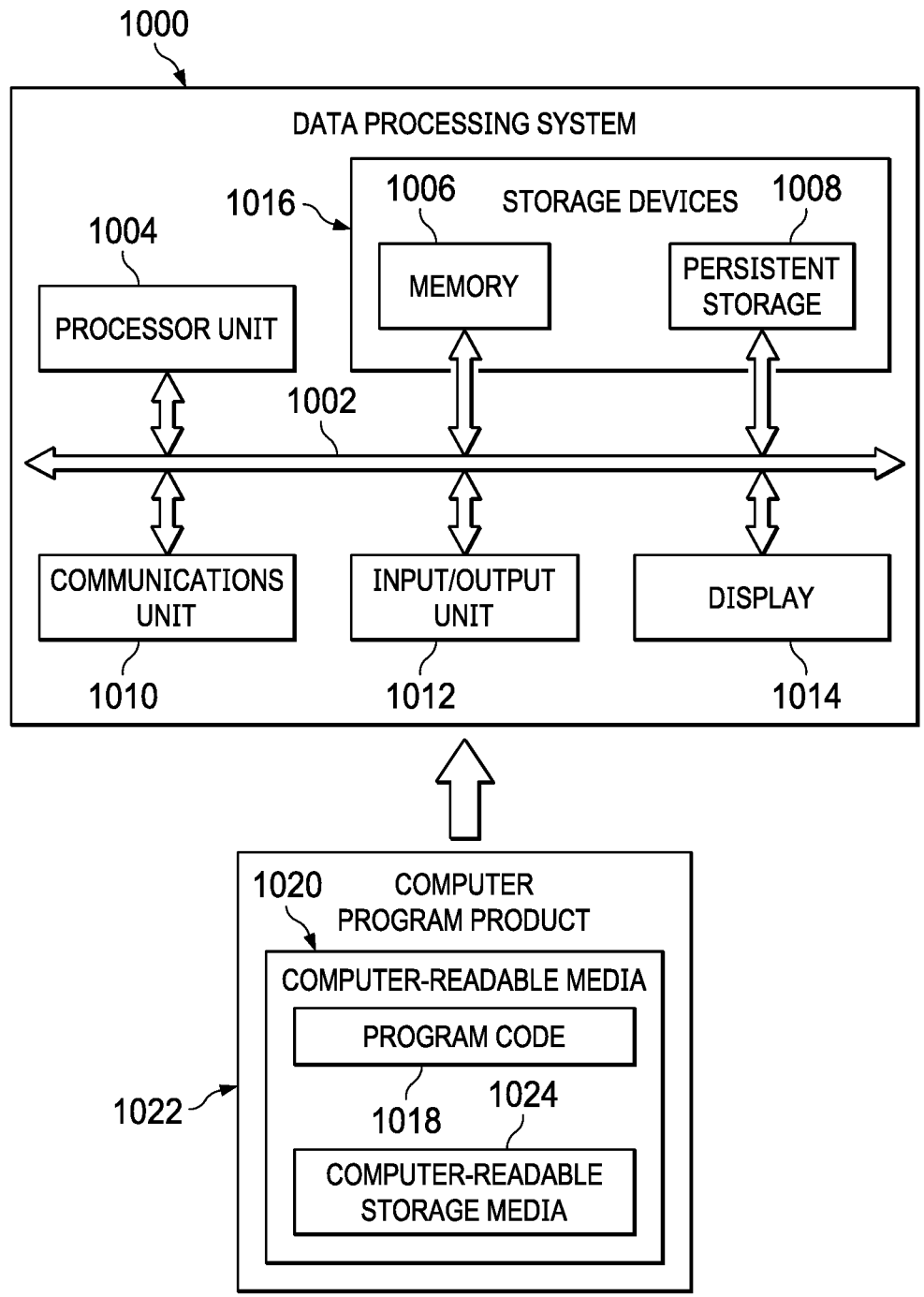
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 can be used to implement computer system 214 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 can take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 can provide a connection for user input through at least one of a keyboard, a mouse, or some other suitable input device. Further, input/output unit 1012 can send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which can be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018. Computer-readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1020" can be singular or plural. For example, program code 1018 can be located in computer-readable media 1020 in the form of a single storage device or system. In another example, program code 1018 can be located in computer-readable media 1020 that is distributed in multiple data processing systems. In other words, some instructions in program code 1018 can be located in one data processing system while other instructions in program code 1018 can be located in one data processing system. For example, a portion of program code 1018 can be located in computer-readable media 1020 in a server computer while another portion of program code 1018 can be located in computer-readable media 1020 located in a set of client computers.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, can be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Figure 11:
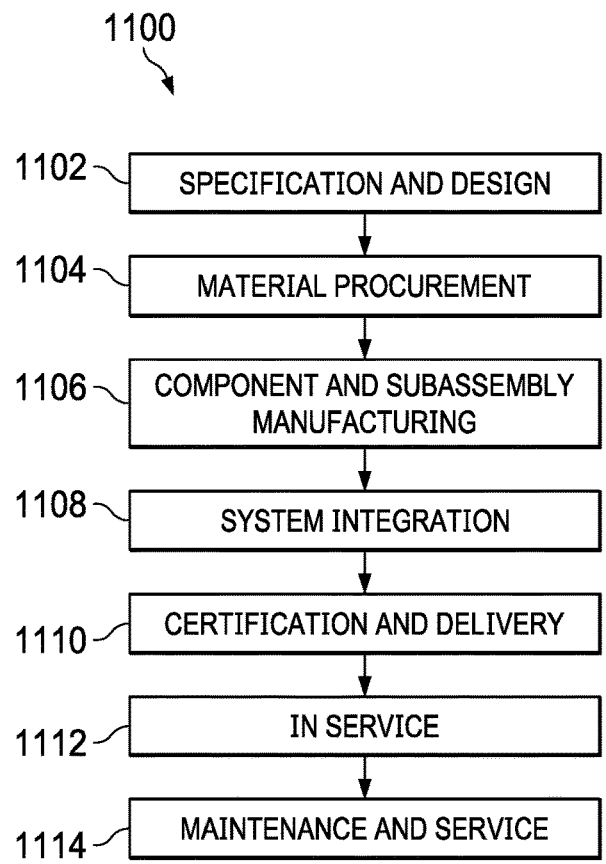
FIG. 11 is an illustration of an aircraft manufacturing and service method in accordance with an illustrative embodiment.
Figure 12:
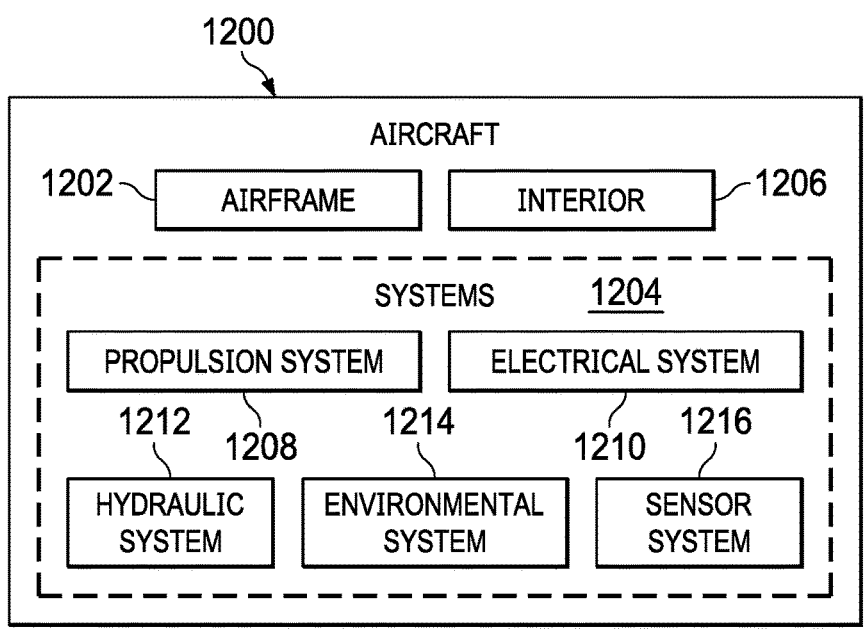
FIG. 12 is an illustration of a block diagram of an aircraft in which an illustrative embodiment may be implemented.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 can go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, environmental system 1214, and sensor system 1216. Any number of other systems may be included. Although an aerospace example is shown, different illustrative embodiments may be applied to other industries, such as the automotive industry. In this illustrative example, sensor system 1216 can be implemented using sensor system 212 shown in block form in FIG. 2. In some illustrative examples, sensor system 1216 may only include sensors such as deployable sensors 202 and external sensors 208. Computer system 214 and sensor manager 216 can be in a different component such as electrical system 1210.

Apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 can be fabricated or manufactured in a manner similar to components or subassemblies produced while aircraft 1200 is in service 1112 in FIG. 11. As yet another example, one or more apparatus embodiments, method embodiments, or a combination thereof can be utilized during production stages, such as component and subassembly manufacturing 1106 and system integration 1108 in FIG. 11. One or more apparatus embodiments, method embodiments, or a combination thereof may be utilized while aircraft 1200 is in service 1112, during maintenance and service 1114 in FIG. 11, or both.

For example, a sensor manager and deployable sensors can be added to sensor system 1216 for aircraft 1200 during at least one of system integration 1108 or maintenance and service 1114. As another example, deployable sensors can be deployed as described in the different illustrative examples during in service 1112 or operation of aircraft 1200. The use of a number of the different illustrative embodiments may substantially expedite the assembly of aircraft 1200, reduce the cost of aircraft 1200, or both expedite the assembly of aircraft 1200 and reduce the cost of aircraft 1200.

Thus, the illustrative examples provide a method, apparatus, and system for managing a sensor system for an aircraft. A presence of erroneous sensor data generated by a set of external sensors on an exterior of the aircraft is detected. A set of deployable sensors is deployed in response to the erroneous sensor data being received from the set of external sensors on the exterior of the aircraft when an undesired environmental condition adverse to the set of external sensors on the exterior of the aircraft is absent. Sensor data is then received from the set of deployable sensors that have been deployed.

Deployment of deployable sensors for an aircraft can be controlled such that sensor data can be provided when external sensors are unable to provide sensor data with a desired level of accuracy. In the illustrative examples, the deployment of the deployable sensors is performed when current external sensors are generating erroneous sensor data and an undesired environmental condition is absent from around the aircraft. In this manner, correct sensor data generation for the aircraft can be restored. This type of process can be useful when environmental conditions cause external sensors to fail to operate in a desired manner.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a sensor system for an aircraft, the method comprising:
   detecting a presence of erroneous sensor data generated by a set of external sensors on an exterior of the aircraft;

deploying a set of deployable sensors in response to the erroneous sensor data being received from the set of external sensors on the exterior of the aircraft when an undesired environmental condition adverse to the set of external sensors on the exterior of the aircraft is absent; and receiving sensor data from the set of deployable sensors.

2. The method of claim 1 further comprising:
determining whether the undesired environmental condition adverse to the set of external sensors on the exterior of the aircraft is absent when the erroneous sensor data is present.

3. The method of claim 2, wherein determining whether the undesired environmental condition adverse to the set of external sensors on the exterior of the aircraft is absent when the erroneous sensor data is present comprises:
determining whether the undesired environmental condition adverse to the set of external sensors on the exterior of the aircraft is absent when the erroneous sensor data is present using a detection system.

4. The method of claim 3, wherein the detection system is selected from at least one of an onboard radar system, a remote radar system, a camera system, an avian radar system, a weather radar system, a light detection and ranging system, or a human operator.

5. The method of claim 1, wherein detecting the presence of the erroneous sensor data generated by the set of external sensors on the exterior of the aircraft comprises:
detecting, by at least one of a computer system or a human operator, the presence of the erroneous sensor data generated by the set of external sensors on the exterior of the aircraft.

6. The method of claim 1, wherein detecting the presence of the erroneous sensor data generated by the set of external sensors on the exterior of the aircraft comprises:
comparing the sensor data generated by the set of external sensors on the exterior of the aircraft to comparison values for the sensor data to form a comparison; and
determining that the sensor data is the erroneous sensor data when a difference in the comparison is greater than a threshold.

7. The method of claim 1, wherein deploying the set of deployable sensors in response to the erroneous sensor data when the undesired environmental condition adverse to the set of external sensors on the exterior of the aircraft is absent comprises:
determining a set of sensor types for the set of external sensors generating the erroneous sensor data; and
selecting the set of deployable sensors as replacements for the set of external sensors based on the set of sensor types.

8. The method of claim 1, wherein deploying the set of deployable sensors in response to the erroneous sensor data when the undesired environmental condition adverse to the set of external sensors on the exterior of the aircraft is absent comprises:
deploying all of the set of deployable sensors in response to the erroneous sensor data when the undesired environmental condition adverse to the set of external sensors on the exterior of the aircraft is absent.

9. The method of claim 1 further comprising:
determining whether the sensor data from the set of deployable sensors deployed on the exterior of the aircraft can be relied on for operating the aircraft; and
replacing the erroneous sensor data generated by the set of external sensors with the sensor data from the set of deployable sensors deployed on exterior of the aircraft when the sensor data from the set of deployable sensors deployed on the exterior of the aircraft can be relied on for operating the aircraft.

10. The method of claim 9, wherein from the set of deployable sensors deployed on the exterior of the aircraft can be relied on for operating the aircraft comprises:
comparing the sensor data generated by the set of deployable sensors deployed on the exterior of the aircraft to comparison values for the sensor data to form a comparison; and
determining that the sensor data can be relied on for operating the aircraft when a difference in the comparison is less than a threshold.

11. The method of claim 1, wherein deploying the set of deployable sensors in response to the erroneous sensor data when the undesired environmental condition adverse to the set of external sensors on the exterior of the aircraft is absent comprises:
receiving a user input commanding a deployment of the set of deployable sensors that is currently undeployed on the exterior of the aircraft.

12. The method of claim 1, wherein the set of deployable sensors is selected from at least one of an air data sensor, pitot tube, an angle of attack vane, a true air temperature probe, a slide slip vane, a static port, an antenna, a satellite antenna, a radio antenna, an icing sensor, an optical sensor, or a radio altimeter.

13. The method of claim 1, wherein the undesired environmental condition is selected from one of lighting, birds, volcanic ash, hail, insects, sand from a sandstorm, and icing on the aircraft.

14. The method of claim 1, wherein the set of external sensors on the exterior and the set of deployable sensors are part of at least one of a federated sensor system in which sensors are in groups or an integrated sensor system in which sensors are centrally managed.

15. The method of claim 1, wherein the erroneous sensor data is present when one or more sensor in the set of external sensors generate the erroneous sensor data or a voting between the sensor data from the set of external sensors indicates that the sensor data is untrustworthy.

16. A sensor system comprising:
computer system; and
a sensor manager in the computer system, wherein the sensor manager is configured to:
detect a presence of erroneous sensor data generated by a set of external sensors on an exterior of an aircraft;
deploy a set of deployable sensors in response to detecting the erroneous sensor data when an undesired environmental condition adverse to the set of external sensors on the exterior of the aircraft is absent; and
receive sensor data from the set of deployable sensors.

17. The sensor system of claim 16, wherein the sensor manager is configured to:
determine whether the undesired environmental condition adverse to the set of external sensors on the exterior of the aircraft is absent when the erroneous sensor data is present.

18. The sensor system of claim 17, wherein in determining whether the undesired environmental condition adverse to the set of external sensors on the exterior of the aircraft is absent when the erroneous sensor data is present, the sensor manager is configured to:
determine whether the undesired environmental condition adverse to the set of external sensors on the exterior of the aircraft is absent when the erroneous sensor data is present using a detection system.

19. The sensor system of claim 18, wherein the detection system is selected from at least one of an onboard radar system located in one of the aircraft, a remote radar system, a camera system, an avian radar system a weather radar system, a light detection and ranging system, or a human operator.

20. The sensor system of claim 16, wherein in detecting the presence of the erroneous sensor data generated by the set of external sensors on the exterior of the aircraft, the sensor manager is configured to:
detect the presence of the erroneous sensor data generated by the set of external sensors on the exterior of the aircraft.

21. The sensor system of claim 16, wherein in detecting the presence of the erroneous sensor data generated by the set of external sensors on the exterior of the aircraft, the sensor manager is configured to:
compare the sensor data generated by the set of external sensors on the exterior of the aircraft to comparison values for the sensor data in to form a comparison; and
determine that the sensor data is the erroneous sensor data when a difference in the comparison is greater than a threshold.

22. The sensor system of claim 16, wherein in deploying the set of deployable sensors in response to detecting the erroneous sensor data when the undesired environmental condition adverse to the set of external sensors on the exterior of the aircraft is absent, the sensor manager is configured to:
determine a set of sensor types for the set of external sensors generating the erroneous sensor data; and
select set of deployable sensors as replacements for the set of external sensors based on the set of sensor types.

23. The sensor system of claim 16, wherein in deploying the set of deployable sensors in response to detecting the erroneous sensor data when the undesired environmental condition adverse to the set of external sensors on the exterior of the aircraft is absent, the sensor manager is configured to:
deploy all of the set of deployable sensors in response to the erroneous sensor data when the undesired environmental condition adverse to the set of external sensors on the exterior of the aircraft is absent.

24. The sensor system of claim 16, wherein the sensor manager is configured to:
determine whether the sensor data from the set of deployable sensors deployed on the exterior of the aircraft can be relied on for operating the aircraft; and
replace the erroneous sensor data generated by the set of external sensors with the sensor data from the set of deployable sensors.

25. The sensor system of claim 24, wherein in whether the sensor data from the set of deployable sensors deployed on the exterior of the aircraft can be relied on for operating the aircraft, the sensor manager is configured to:
compare the sensor data generated by the set of deployable sensors deployed on the exterior of the aircraft to comparison values for the sensor data to form a comparison; and
determine that the sensor data can be relied on for operating the aircraft when a difference in the comparison is less than a threshold.

26. The sensor system of claim 16, wherein in deploying the set of deployable sensors in response to detecting the erroneous sensor data when the undesired environmental condition adverse to the set of external sensors on the exterior of the aircraft is absent, the sensor manager is configured to:
receive a user input commanding a deployment of the set of deployable sensors that is currently undeployed on the exterior the aircraft.

27. The sensor system of claim 16, wherein the set of deployable sensors is selected from at least one of an air data sensor, a pitot tube, an angle of attack vane, a true air temperature probe, a slide slip vane, a static port, an antenna, a satellite antenna, a radio antenna, an icing sensor, an optical sensor, or a radio altimeter.

28. The sensor system of claim 16, wherein the undesired environmental condition is selected from one of lighting, birds, volcanic ash, hail, insects, sand from a sandstorm, and icing on the aircraft.

29. The sensor system of claim 16, wherein the set of external sensors on the exterior and the set of deployable sensors are part of at least one of a federated sensor system or an integrated sensor system.

30. The sensor system of claim 16, wherein the erroneous sensor data is present when one or more sensor in the set of external sensors generate the erroneous sensor data or a voting between the sensor data from the set of external sensors indicates that the sensor data is untrustworthy.

* * * * *

UNITED STATES PATENT AND TRADEMARK OFFICE
CERTIFICATE OF CORRECTION

| | |
|---|---|
| PATENT NO. | : 11,548,662 B2 |
| APPLICATION NO. | : 16/903817 |
| DATED | : January 10, 2023 |
| INVENTOR(S) | : Alessandro E. Galli |

It is certified that error appears in the above-identified patent and that said Letters Patent is hereby corrected as shown below:

In the Claims

Column 19 Lines 6-7 correct "an avian radar system a weather radar system," to read -- an avian radar system, a weather radar system, --

Signed and Sealed this
Fourth Day of April, 2023

Katherine Kelly Vidal
*Director of the United States Patent and Trademark Office*